United States Patent [19]

van Muyden

[11] 4,443,904
[45] Apr. 24, 1984

[54] BEE HIVE

[76] Inventor: Willem G. F. van Muyden, Noord 27, 8377 HA Kalenberg, Netherlands

[21] Appl. No.: 366,009

[22] Filed: Apr. 6, 1982

[30] Foreign Application Priority Data

Apr. 13, 1981 [NL] Netherlands .................. 8101797

[51] Int. Cl.³ .................. A01K 47/06; A01K 53/00
[52] U.S. Cl. ................................. 6/1; 6/5
[58] Field of Search ................ 6/1, 4 R, 5, 7

[56] References Cited

U.S. PATENT DOCUMENTS

| 218,097 | 7/1879 | Weyer et al. | 6/5 |
| 2,530,801 | 11/1950 | Babcock, Jr. | 6/1 |
| 3,439,364 | 4/1969 | Paoletti | 6/4 R X |
| 3,526,913 | 9/1970 | Warner | 6/5 |
| 4,300,250 | 11/1981 | Taylor | 6/1 |

FOREIGN PATENT DOCUMENTS

| 2239340 | 2/1974 | Fed. Rep. of Germany | 6/7 |
| 54153 | 5/1923 | Sweden | 6/5 |

Primary Examiner—Robert P. Swiatek
Attorney, Agent, or Firm—Holman & Stern

[57] ABSTRACT

A bee hive assembly comprising one or more hive elements supported as a stack on a base element and covered by a roof element. Each hive element comprises a frame having at each of two opposite sides a window-like frame opening covered by a transparent panel. A liquid storage tank is fittingly mounted in the frame opening inwardly of and spaced from the transparent panel. The storage tank has transparent walls, a removable cover closing its upper side, and a drinking trough formed at the bottom end of the rear wall of the tank and having a width smaller than the width of the body of a worker-bee. The tank is provided with a liquid level control for maintaining the liquid in the drinking trough at a constant level which is accessible to the bees from the interior of the hive.

14 Claims, 2 Drawing Figures

BEE HIVE

BACKGROUND OF THE INVENTION

The invention relates to a bee hive assembly of the type comprising one or more stackable box-like hive elements adapted to receive comb frames and each comprising four sides, a roof element for said one or more hive elements, and a base element for supporting said one or more hive elements and having a bee entrance opening.

As is well known, a colony of bees lives in four phases: the winter period, the propagation, the swarming and the honey (nectar) collecting. Preferably, the climatic circumstances in the bee hive should be adapted to these different phases which requires special provisions. The conventional bee hive has closed walls of wood or another suitable material whereby the hive forms a dark and humid interior space which offers insufficient possibilities to regulate and adapt the habitat inside the hive from the outside. This means that this adaptation must be brought about by the activities of the bees themselves which requires much energy from the bees at the cost of the honey production and the lives of many bees. Furthermore fewer bees are available to take care of the brood, as a consequence of which the queen produces less eggs. It has been suggested to provide one or more of the walls of the hive with a glass panel so that light can penetrate into the hive. It has been shown that such daylight receiving hives have certain advantages, such as the brood forming being stimulated, starting earlier in the spring and being prolonged in the fall, the bees each day working at least two hours longer, the eyesight of the young bees developing better and quicker, and the bees generally being more hardy and producing good queens. Furthermore, the light checks the development of rot, decease and mold in the hive. However, a light-receiving bee hive requires special provisions to prevent undesirable temperature fluctuations in its interior. As a general rule it can be said that in order to maintain the proper living conditions in a bee hive an equable temperature of sufficient level should exist without requiring the bees themselves to produce much heat to maintain such temperature. Also the relative humidity of the air in the hive should be as low as possible which means that a proper but draught-free ventilation should be provided for the removal of the water vapour (and carbon dioxide) developed inside the hive, without this ventilation leading to excessive heat losses. It is further of great importance that the bees have always sufficient drinking water available inside the hive so that they are not forced to collect water from outside. Such water collecting requires extra energy from the bees and the water collecting bees are especially susceptible to heat loss caused by evaporation of the water they carry along.

SUMMARY OF THE INVENTION

It is accordingly an object of the invention to provide a bee hive of the kind described which fulfills the above-described requirements and which maintains with simple means an optimal interior climate for the colony of bees in the four above-mentioned living phases.

According to one aspect of the invention, each hive element of the bee hive assembly has at least one of its sides formed by a window-like frame opening covered by a transparent panel and a liquid storage tank arranged fittingly in this frame opening spaced inwardly of the transparent panel so as to form a heat insulating airspace therewith. The liquid storage tank includes a transparent front wall and rear wall, a removable cover closing its upper side and a drinking trough formed at the lower end of the tank rear wall communicating with the interior of the tank and having a width smaller than the width of the body of a bee, the tank being provided with liquid level control means for maintaining the liquid in the drinking trough at a substantially constant level which is accessible to the bees from the inside of the hive.

The transparent liquid storage tank arranged inwardly of the transparent panel thus serves simultaneously a number of functions. In the first place the storage tank forms, together with the transparent panel, a light transmitting heat insulating multiple window pane through which the sunlight can enter into the hive and which allows the bee-keeper to observe the developments inside the hive without disturbing the bees. In the second place the storage tank filled with water or another suitable liquid forms a heat accumulator tending to equalize temperature changes inside the hive. Thereby a more uniform interior climate is obtained and the bee colony has to make less effort to control the same. This is particularly of importance in the winter because a higher mean interior temperature can then be obtained by the accumulation of the heat of the sun. In the third place the liquid storage tank, which can be filled from the outside serves as a source of water for the bees while, if required, food can be added to the water. The bee colony is thus not charged with the collecting of water and food in times of propagation. By giving the drinking trough a small width the bees cannot fall into the trough and drown.

The transparent panel preferably consists of a plate of a suitable plastic material having parallel hollow channels formed therein so as to increase its heat-insulating properties. Such plates are well known.

In the space between the transparent panel and the front wall of the liquid storage tank a screen may be removably arranged for regulating or shutting off the incoming light, for instance to prevent overheating in the summer or to darken the hive compartment to stimulate nectar collecting. Such a screen also further increases the heat insulation.

According to another important aspect of the invention the roof element of the hive comprises an inner cover member including a sheet of transparent material and having ventilation slots along at least one of its sides, and an inclined outer cover member likewise including a sheet of transparent material spaced from the inner cover member and substantially enclosing the latter while leaving one or more ventilation slots between its lower side and the upper side of the inner cover member. The cover element thus forms a double upper wall of the hive providing a good heat insulation and a draft-free ventilation at the upper side of the hive. Possible condensation of moisture in the air does not occur on the inner cover member inside the hive but against the lower side of the inclined outer cover member from which the condensed drops can flow outwards through the ventilation slot. Because of the transparency of both cover members, daylight can also enter into the hive from above, and, in the space between the inner and outer cover members, screens of different type can be placed, for instance to darken the interior of the hive, to suppress heat radiation at night or to filter strong sunlight.

According to yet another aspect of the invention the base element comprises a frame, a vapour-transmitting condenser element mounted in the frame, and an antechamber formed within the frame in front of the condenser element, which antechamber communicates with the entrance opening and with the interior of the hive element thereabove.

The condenser element may comprise a body of rockwool or a similar material enclosed between sheets of a suitable fabric material and supported on wire gauze secured in the frame. The upper side of the condenser element turned towards the interior of the hive will have a higher temperature than its exposed lower side situated in the shade below the bottom of the hive and because of this temperature difference water vapour will not condense inside the hive but in the condenser element and will flow outwards from this element. Thereby a dry interior climate is obtained and when water evaporates from the stored honey inside the hive the excess of moisture caused thereby is thus removed from the hive. In this manner the ventilation to the exterior need only be small and thus the heat loss remains low.

BRIEF DESCRIPTION OF THE DRAWINGS

The drawings show a preferred embodiment of the bee hive assembly according to the invention.

DESCRIPTION OF THE PREFERRED EMBODIMENT

Figure 1:
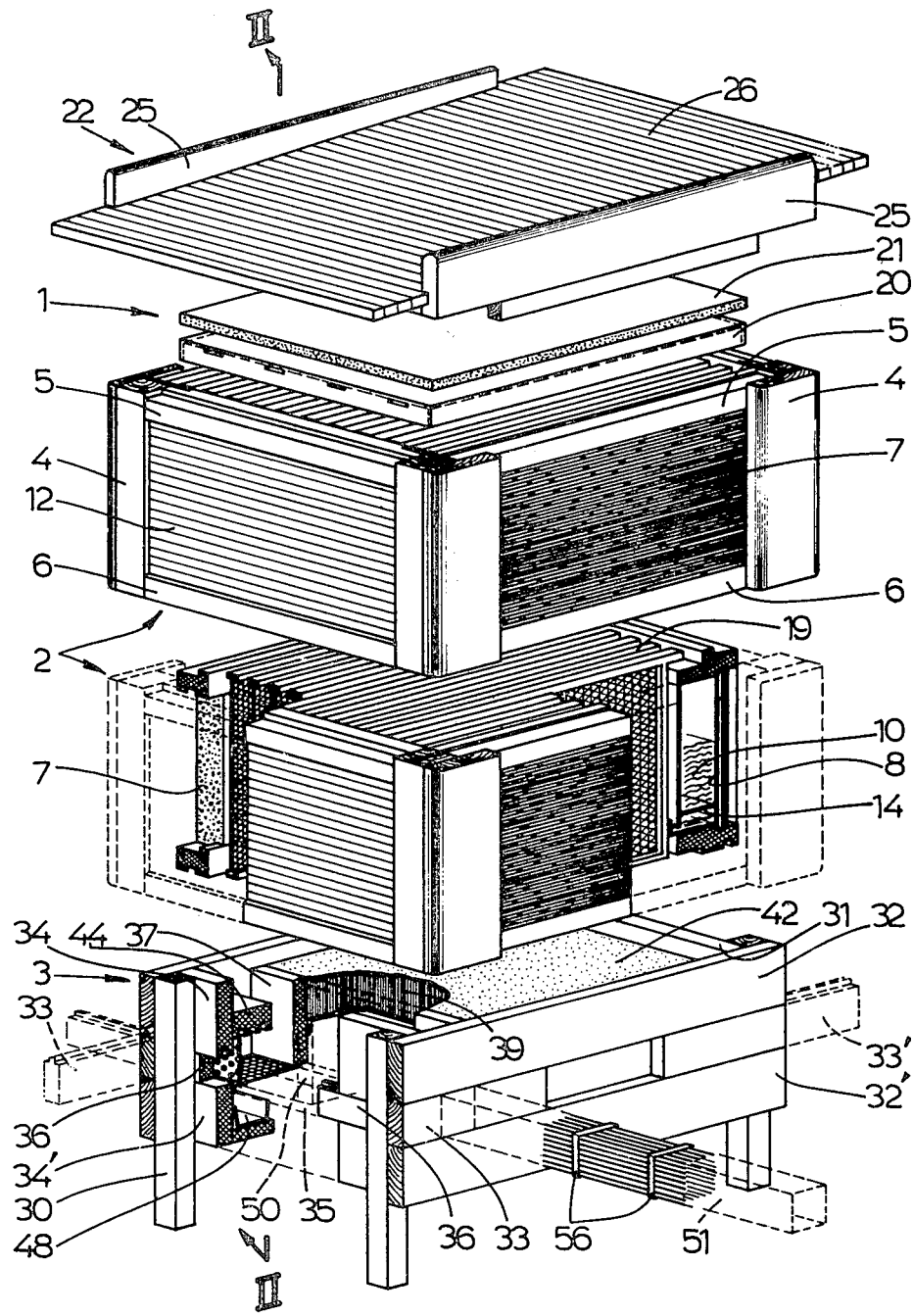
FIG. 1 is an exploded perspective view of the bee hive assembly of the invention.

Referring to the drawings, the bee hive there shown has as main parts a roof element 1, one or more box-like hive elements 2 and a base element 3, which elements can be assembled by simply stacking one upon the other as shown. In FIG. 1 two hive elements 2 are shown, but generally there will be a larger number of such hive elements.

Each stackable hive element 2 has an open rectangular four-sided frame consisting of vertically extending corner posts 4 connected at their upper and lower sides by horizontally extending upper and lower profile beams 5 and 6, respectively, in such a manner that the frame has an open top and bottom and a front side, rear side and lateral sides each formed with a rectangular window-like opening. The two lateral sides of the frame of the hive elements 2 are each closed by a compressed body of reed 7 fittingly received in the window opening between the beams 5 and 6 of these frame sides and removably secured therein by securing means accessible from the inside of the frame (not visible in the drawings) so as to be easily exchangeable.

Figure 2:
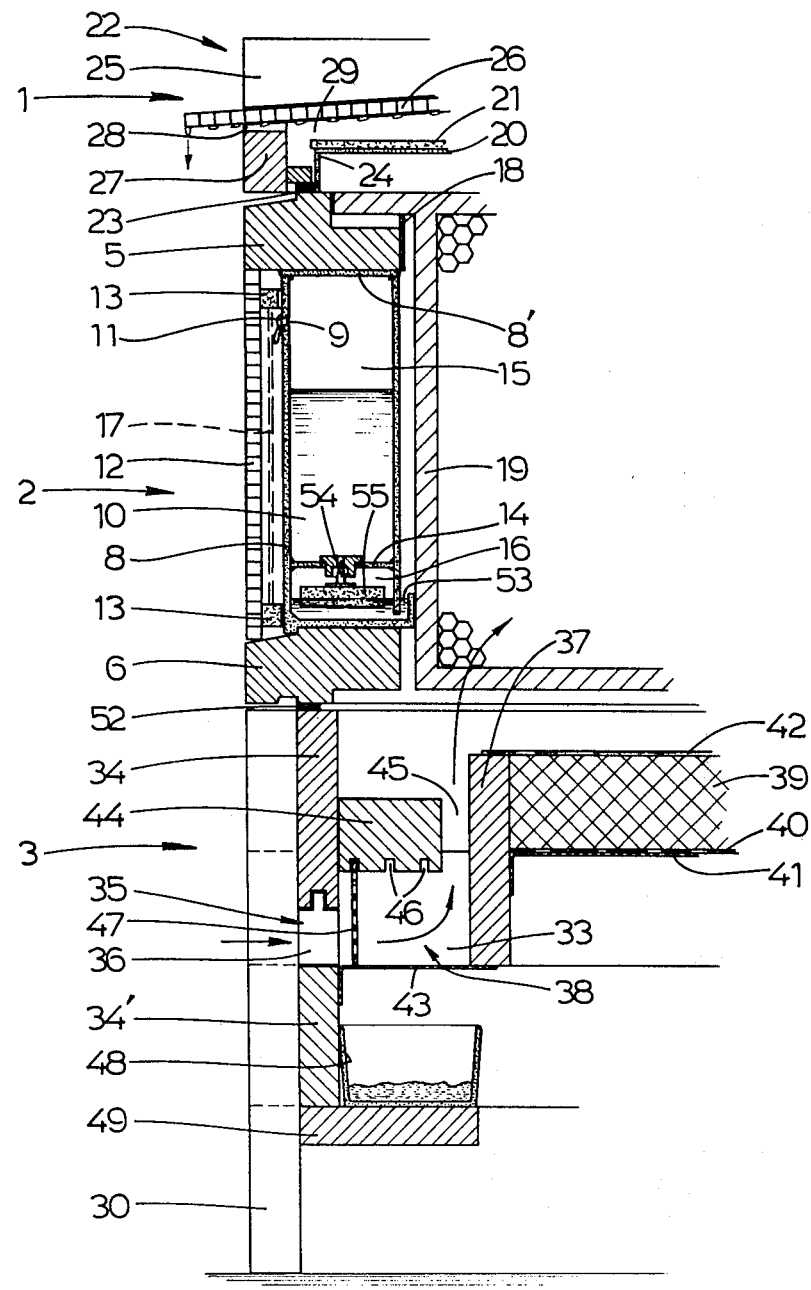
FIG. 2 is, on a larger scale, a vertical cross section of view taken on the line II—II of FIG. 1 of an assembled bee hive with, however, only a single hive element.

The front wall and the rear wall of the hive element 2 have the same structure as best shown in FIG. 2. As there shown, a liquid storage tank 8 is removably mounted in the window opening of the front side of the frame of the hive element 2 which tank 8 closely fits between the front posts 4 and the upper and lower beams 5 and 6 so as to form a substantially air-tight closure of said window opening. The tank 8 is made of a suitable transparent plastics material and is closed at its upper side by a removable cover 8'. The outer wall of the tank 8 has a filling opening 9 closed by a removable plug 11 and allowing the tank to be filled from the outside of the hive with water 10 to which, if required, nutriment can be added. A horizontally extending partition wall 14 spaced from the tank bottom divides the interior of the tank into an upper storage compartment 15 and a smaller and lower compartment 16 which communicates, through holes in the tank rear wall, with a drinking trough 53 formed adjacent the tank bottom on the inwardly turned side of the tank 8 so as to be accessible to the bees inside the hive. The drinking trough 53 extends across the whole length of the tank 8 and has a width which is smaller than the width of the body of a bee so that the bees cannot fall into and drown in the trough 53. Liquid level control means are provided to maintain a constant water level in the trough 53 which control means comprise a needle valve 54 mounted in the partition wall 14 and a float 55 in the lower tank compartment 16 which controls the movable valve body of the needle valve 54 so as to close this valve when the water in the compartment 16 has reached the required level just below the upper rim of the trough 53.

A transparent panel or front plate 12 is arranged in front of the tank 8 and spaced therefrom by means of spacing strips 13 of resilient material attached to the front plate 12. The front plate 12 closely fits in the window opening enclosed by the front posts 4 and the beams 5 and 6 of the frame of the bee hive 2, the plate 12 being removably held in position by securing means not shown. The front plate 12 is made of a suitable plastic material and has longitudinally extending hollow channels formed therein in a known manner whereby the plate has a light weight and good heat-insulating properties. The front plate 12 is removably held in the frame opening by clamping means not shown.

The tank 8 filled with water thus forms a transparent front wall which after removal of the front plate 12 allows the inspection of the interior of the hive element. The tank 8 filled with water does not only serve to provide water and, if desired, nourishment to the bees in the hive but also forms a heat accumulator which equalizes strong temperature fluctuations in the hive element and which, together with the front plate 12, provides an efficient heat insulation preventing excessive cooling of the hive interior at night. When required, it is possible to place a screen 17 in the space between the tank 8 and the front plate 12 which screen may be translucent to diffuse incident sun rays or opaque if it is desirable to darken the interior of the hives. This screen may also have a further heat-insulating function.

The upper frame beam 5 has at its rear side a recessed portion carrying an upwardly projecting metal strip 18 which serves to support a row of honey comb frames 19 of conventional type extending parallel to the lateral sides of the hive element.

The roof element 1 forming the top of the hive assembly comprises a number of separate parts, that is an inner cover member 20, an exchangeable screen plate 21 supported thereon, and an outer cover member 22 substantially enclosing the inner cover member. The inner cover member 20 is a box-like structure of transparent plastic material with a flat upper wall and downwardly extending side walls. The member 20 rests with the lower edges of its side walls on the upper side of the frame beams 5 of the upper hive element 2 within a circumferentially extending holding strip 23 of resilient material (FIG. 2). Ventilation slots 24 have been formed in the upper region of the vertical front wall and rear wall of the box-like inner cover member 20.

The upper cover member 22 comprises a frame 25 which finds support in a fixed position on the resilient strip 23 secured on the upper sides of the frame beams 5 of the upper hive element 2 (see FIG. 2). As shown, the side beams of the frame 25 have a greater height and are each provided with a longitudinally extending inclined slot for receiving the side edges of a transparent cover plate 26 which projects outwards at the front and the rear of the hive. The front beam 27 of the frame 25 has a lower height than the side beams of the frame and a ventilation slot 28 has been formed between the upper side of this beam 27 and the cover plate 26 extending thereabove whereby water drops resulting from vapour condensing against the lower face of the cover plate 26 will flow outwards along this cover plate and through the slot 28.

The air space 29 formed between the cover plate 26 and the inner cover member 20 increases the heat insulation at the upper side of the hive which space is lightly ventilated through the slots 24 and 28. Condensing will thus not occur against the inner face of the inner cover member 20 but against the inner face of the cooler cover plate 26. Preferably, the cover plate 26 is again made from a translucent plastic material of the same type as used for the plates 12.

The type of the screen 21 used to cover the inner cover member 20 depends on the occurring circumstances. This screen may consist of a white plate of foamed polystyrene or a similar material and thus serve as a heat screen to increase the insulation value of the roof of the hive in times of intense cold and strong nightly heat radiation, without, however darkening the hive. Instead thereof, it is also possible to use as a screen a white fabric of synthetic material as a protection against sun rays falling upon the roof, while also a non-transparent screen such as a black fabric can be used if the hive should be darkened.

After removal of the upper cover member 22 the inner cover member 20 can be lifted for inspecting the bee colony without disturbing the same.

The base element 3 comprises a rectangular frame 31 with vertical walls and resting on legs 30. The lateral walls of this frame each comprise two side beams 32, 32' enclosing a longitudinally extending slot therebetween in which slot two slide members 33, 33' have been arranged which in their outwardly moved positions (shown in fig. 1 with dotted lines) form handles for lifting the hive. The front side of the frame 31 likewise comprises two front beams 34, 34' separated by a longitudinally extending slot forming a bee entrance opening 35. The longitudinal extension or width of this entrance opening can be adjusted by means of two slides 36 arranged opposite one another in the slot-like opening. These slides 36 can only be moved outwards when first the slide members 33 have been moved backwards. In the closed position of the bee entrance slides 36 these slides can be locked in place by the lateral slides 33.

The base frame 31 is provided with a partition beam 37 extending parallel to the front beams 34, 34' and dividing the interior of the base frame into a front part forming an antechamber 38 for the bees to the rear of the bee entrance opening 35, and a rear part in which a bottom closure is arranged. This bottom closure is formed as a vapour condenser element and consists of a vapour transmitting body of rock wool 39 or a similar material supported on wire gauze 41 secured in the rear part of the base frame 3. A filter cloth 40 is placed between the body 39 and the gauze 41 and a similar filter cloth 42 covers the upper side of the rockwool body. Water vapour formed in the hive will diffuse through the body 39 of rockwool and condense at the relatively cool lower side of the body to flow downwards out of the hive. In this way a dry interior climate is obtained.

The antechamber 38 is bordered at its lower side by metal gauze 43 and at its upper side by a roof beam 44 projecting inwardly from the frame beam 34 but leaving a slotlike passage 45 between the roof beam 44 and the partition beam 37. Thus the bees can reach the interior of the hive from the antechamber 38 (see the arrows in FIG. 2) and vice versa. The antechamber 38 extends across the whole width of the hive behind the bee entrance opening 35 and its two ends are situated at the level of the opening between the lateral frame beams 32, 32' at each side of the frame 3 whereby the chamber 38 is accessible from both sides by manipulation of the slides 33.

Three longitudinally extending grooves 46 have been formed in the lower face of the roof beam 44 and different screen elements, such as the screen 47, can be moved into these grooves 46 through the above-mentioned open ends of the chamber 33, the screen elements resting on the metal gauze bottom 43 of the chamber 33. Screen elements which can be used include a queen retaining screen having openings through which the worker-bees and the drones can pass but not the queen; a drone retaining screen having openings so formed that the drones can only pass therethrough from the inside of the hive to the outside but not from the outside to the inside; and a pollen trap which removes the pollen carried by the bees when they pass through the openings of this trap. The pollen thus removed can be collected in a pollen receptacle 48 placed on a shelf 49 below the wire gauze 43 forming the bottom of the chamber 33. Screens of the above-described type are well-known in the art of bee keeping and therefore not described in further detail. As shown in FIG. 1 with dotted lines, the antechamber 38 together with the bee entrance opening 35, the passage 45 and the space within the base element 3 above the roof beam 44 and the condenser element 39 are preferably divided into two separate halves by a partition wall 50 extending midway of the frame 3 from front to rear. Similar partition walls can be placed in the hive elements 2 whereby, if desired, the whole interior of the hive can be divided into two equal parts in case the hive should house two bee colonies.

As shown in FIG. 1 with dotted lines, a swarming channel member 51 can be connected to one of the end openings of the antechamber 38 when the slide 33 has been pushed away. This channel member 51 has a rectangular cross-section and is made of parallel metal rods held together by cross bands 56. The spacing between these rods is such that the worker-bees can pass therethrough but not a queen bee. The opposite end of the channel member 51 can be connected in a similar way to an adjacent hive. After closing the bee entrance opening 35 by a queen retaining screen it is thus possible to catch a swarming queen bee together with her colony in the adjacent hive. When, for instance three hives in a row are used of which the middle hive is partitioned to form two separate parts as abovedescribed, this middle hive can receive a swarm of bees from each of the two outer hives. The vertical division of the hive is also of advantage if two colonies of bees are to be united or if two small colonies are to be housed for the winter in a single hive while maintaining separate brood and honey chambers.

As can be seen in FIG. 2, the hive elements 2 and the base element 3 fit one upon the other with sealing strips 52 therebetween. It is further possible to arrange a horizontally extending queen retaining screen between two hive elements 2 in order to separate a brood chamber from a honey chamber (not shown).

The frames of the hive elements 2, the upper cover member 22 and the base element 3 can be made of any suitable material, such as wood or a synthetic material.

Although the invention has been shown and described with reference to a preferred embodiment thereof several modifications can be made therein within the scope of the following claims.

What is claimed is:

1. A bee hive assembly comprising one or more box-like hive elements one stacked upon the other, each hive element comprising four sides and each being adapted to receive a plurality of comb frames in spaced parallel relationship extending perpendicularly to two opposite ones of said four hive element sides, a roof element for said one or more hive elements, and a base element for supporting said one or more hive elements and having a bee entrance opening, each of said hive elements having in at least one of its said two opposite sides a window-like frame opening, a transparent panel covering said frame opening, and a transparent liquid storage tank fittingly mounted in said frame opening inwardly of and spaced from said transparent panel to form a substantially closed heat insulating air space between said panel and tank, said tank including a transparent front wall and rear wall, and said tank being closed at its upper side, a drinking trough arranged at the lower side of the inwardly facing wall of said tank, said trough communicating with the interior of the tank and having a width smaller than the width of the body of a worker-bee, and liquid level control means for maintaining the liquid in said drinking trough at a substantially constant level which is accessible to the bees from the inside of the hive.

2. The bee hive assembly of claim 1 in which said transparent panel consists of a plate of a suitable plastic material having parallel hollow channels formed therein.

3. The bee hive of claim 1 further comprising a screen adapted to be removably arranged in the space between said transparent panel and said liquid storage tank for regulating or completely shutting-off the incoming light or for further heat insulation.

4. The bee hive assembly of claim 1 in which both the front side and the rear side of the hive element are provided with said transparent panel and spaced transparent liquid storage tank, the lateral sides of the hive element comprising a non-transparent, vapour-permeable heat insulating material such as an exchangeable packet of reed.

5. The bee hive assembly of claim 1 in which said roof element comprises an inner cover member including a sheet of transparent material, said inner cover member fitting on the upper one of said hive elements and having ventilation slots along at least one of its sides, an outer cover member substantially enclosing said inner cover member and including a sheet of transparent material mounted in an inclined position spaced from the inner cover member therebelow, said outer cover member having one or more ventilation slots formed below said latter inclined transparent sheet at the lower end of the latter.

6. The bee hive assembly of claim 5 further comprising a screen adapted to be placed in the space between said inner and said outer cover members for regulating the light transparency and/or the heat insulating properties of said roof element.

7. The bee hive assembly of claim 1 in which said base element comprises a frame, a vapour transmitting condenser element mounted in said frame, and an antechamber formed within said frame in front of said condenser element, said antechamber communicating with said bee entrance opening and with the interior of the hive element resting on said base element.

8. The bee hive assembly of claim 7 in which said condenser element comprises a body of rockwool or a similar material, a sheet of filtering cloth covering said body, and a member of wire gauze secured in said base frame element and supporting said body.

9. The hive assembly of claim 7 in which said antechamber extends across the whole width of said base element frame terminating at both sides in open ends, slide members being movably mounted in the lateral sides of said base element frame adapted to open or close said antechamber open ends.

10. The bee hive assembly of claim 9 in which said base element frame comprises in each of its lateral sides a longitudinally extending slot means and two slide members slidably mounted in said slot means and each adapted to be moved to positions projecting from said base element frame to form handles for carrying the hive assembly.

11. The hive assembly of claim 9 further comprising a swarming channel member having open ends adapted to be fitted to said antechamber open ends whereby said channel member can form a connecting passage between the antechambers of two bee hives arranged side by side.

12. The bee hive assembly of claim 11 in which said swarming channel member is formed by a plurality of longitudinally extending parallel rods secured to each other in spaced relationship, the spacing between said rods being such as to allow worker-bees to pass therethrough but not a queen bee.

13. A bee hive assembly comprising one or more box-like hive elements one stacked upon the other, each hive element comprising four sides and each being adapted to receive a plurality of comb frames in spaced parallel relationship extending perpendicularly to two opposite ones of said four hive element sides, a roof element for said one or more hive elements, and a base element for supporting said one or more hive elements and having a bee entrance opening, each of said hive elements having each of its said two opposite sides formed by a window-like frame opening, a transparent panel covering each of said two opposite frame openings, a liquid storage tank fittingly mounted in each of said two opposite frame openings inwardly of and spaced from said transparent panel in said opening so as to form a substantially closed heat insulating air space between said panel and tank, said tank including a transparent front wall and rear wall and said tank being closed at its upper side, a drinking trough arranged at the lower side of the inwardly facing rear wall of said tank, said trough communicating with the interior of the tank, and liquid level control means for maintaining the liquid in said drinking trough at a substantially constant level which is accessible to the bees from the inside of the hive.

14. The bee hive of claim 13, further comprising a screen adapted to be removably arranged in said air space between one of said two transparent panels and said liquid storage tank associated with said panel for regulating or completely shutting-off the incoming light or for further heat insulation.

* * * * *